United States Patent
Wang et al.

(10) Patent No.: US 7,388,761 B1
(45) Date of Patent: Jun. 17, 2008

(54) HIGH EFFICIENCY PARALLEL POST REGULATOR FOR WIDE RANGE INPUT DC/DC CONVERTER

(75) Inventors: Xiangcheng Wang, Orlando, FL (US); Issa Batarseh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 144 days.

(21) Appl. No.: 11/391,167

(22) Filed: Mar. 28, 2006

(51) Int. Cl.
*H02M 3/335* (2006.01)
(52) U.S. Cl. .......................... 363/17; 363/89
(58) Field of Classification Search ............ 363/15–20, 363/89, 81–84, 23, 125, 127, 98
See application file for complete search history.

(56) References Cited

U.S. PATENT DOCUMENTS

| | | | | |
|---|---|---|---|---|
| 6,130,828 | A * | 10/2000 | Rozman | 363/21.06 |
| 6,178,098 | B1 | 1/2001 | He et al. | 363/17 |
| 6,449,175 | B1 | 9/2002 | Cuadra et al. | 363/89 |
| 6,469,914 | B1 | 10/2002 | Hwang et al. | 363/21.01 |

* cited by examiner

*Primary Examiner*—Rajnikant B Patel
(74) *Attorney, Agent, or Firm*—Brian S. Steinberger; Phyllis K. Wood; Law Offices of Brian S Steinberger, P.A.

(57) ABSTRACT

Apparatus, methods, system and devices for providing a high efficiency parallel post regulator for a wide range input DC/DC converter. The wide input range DC/DC converter achieves zero-voltage-switching in the primary side switches in full range load due to 0.5 duty cycle of the operation at full load. The DC/DC converter reduces voltage stresses across main rectifiers, has a smaller conduction losses compared with conventional post regulators and the requirement of input and output filters is significantly reduced due to the filtered waveforms produced.

11 Claims, 8 Drawing Sheets

HIGH EFFICIENCY PARALLEL POST REGULATOR FOR WIDE RANGE INPUT DC/DC CONVERTER

FIELD OF THE INVENTION

This invention relates to direct current-to-direct current converters (DC/DC) and, in particular, to methods, systems, apparatus and devices for a high efficiency and high power density wide input range front end DC/DC converter for use in distributed power systems and server power supplies.

BACKGROUND AND PRIOR ART

Range winding topology activates to increase the transformer turn-ratio for hold up time when the input DC voltage drops to certain value, so the converter is only required to be designed for narrow range input and it operates with large duty cycle with easy soft switching in the primary side resulting in good efficiency. At the same time range winding topology needs small current rating components because only certain hold up time, such as 20 ms, is its operation. However, transient problems occur during range winding activation because of the nonlinearity of range winding topology performance and the limitation of the close-loop bandwidth.

Conventional secondary side post regulators (SSPR) control the pulse width to regulate the tight output voltage and the primary side switches operate at 0.5 duty cycle, resulting in very easy conditions for soft switching in the primary side. But post regulators introduce extra conduction loss in the secondary side. Also post regulators cannot reduce the voltage stress across the secondary side rectifiers in wide range input DC/DC converter because the converter is required to be designed in the lowest DC input voltage and operates in the highest DC input voltage, so the efficiency resulting from the use of a conventional post regulator is poor.

In medium power rating converters, a half bridge converter is attractive because of its simplicity and low transformer turn-ratio. In wide range input DC/DC converters, conventional half bridge does not achieve zero voltage switching (ZVS) in the primary side because of small duty cycle operation. Asymmetrical half bridge converter and duty cycle shifting (DCS) control can achieve ZVS under certain conditions, but it does not provide ZVS in full range loads. In wide range input conditions, the efficiency of the half bridge converter is low. The best efficiency of isolated converters such as half bridge, full bridge and push pull topologies, exist in the conditions of approximately 0.5 duty cycle in the primary side, there is still the problem of regulating the output voltage.

Generally, wide range input DC/DC converters are designed at the minimum input voltage Vin min and always operates at the maximum input voltage Vin max with a small duty cycle, which makes very difficult to achieve soft switching in the primary side switch while achieving higher voltage stresses in the secondary rectifier that have large conduction and switching losses, so that the resulting converter has low efficiency.

FIG. 1 is a graph showing the operational point and design points for prior art front end DC/DC converters. With a requirement for a holdup time when the line input dropout occurs, the converter has to provide the regulated output voltage during holdup time, which means front end DC/DC converter has to operate in wide range input voltage between maximum and minimum voltage as shown on the graph. Most of time the converter operates at high input Vin max, and it only operates for very short holdup time when AC line dropout. So the converter should be designed in lowest voltage Vin min and it operates in high input voltage Vin max with very small duty cycle, which makes it very difficult to achieve soft switching and high voltage stresses across the secondary side rectifiers, all of those result in low efficiency in wide range input DC/DC converter.

FIG. 2 shows an example of a prior art half bridge converter and FIGS. 3a, 3b and 3c show different types of conventional prior art secondary side post regulators. FIG. 3d shows the range winding topology. Secondary side post regulators regulate the output voltage using secondary side control and the primary side easily achieves zero-voltage-switching in full range load due to 50% duty cycle operation. Main rectifiers are composed of rectifiers D1 and D2, filter Lf and output capacitor Co and the post regulator composed of rectifiers D3, D4 and switches Q3 and Q4.

In FIG. 3a, switches Q3 and Q4 are connected in series with the main rectifiers to control the pulse width for tight regulation of the output voltage with ZVS if the switches turn on or off at the intervals of main rectifiers' current commutation, but this series type SSPR it introduces large conduction loss due to large current ratings in the current path especially in low voltage applications. At the same time, this series type SSPR cannot reduce the voltage rating across the main rectifiers in wide range input converter in wide range input converter.

In FIG. 3b, switches Q3 and Q4 are series with D1 and D2 respectively and they can achieve ZCS. However, this is a cascade system so total converter efficiency is a concern during design. Also the cascade system cannot reduce the voltage rating across the main rectifiers in a wide range input converter.

The schematic diagram of FIG. 3c shows a combination of the topology of FIG. 3b and the rectifier in FIG. 1 to reduce the output filter inductance and to reduce the voltage rating across the main rectifiers in a wide range input converter. However, the combination increases conduction losses in primary side switches and post regulator because of the high current rating in the current path when the post regulator is activated.

In FIG. 3d, switch Q3 of range winding topology turns on when primary input voltage drops to certain value, the increased transformer turn ratio extends the hold up time so that the range winding topology can be designed in narrow input range. However, the transient response is the problem because of nonlinearity of range winding topology and bandwidth limitation.

SUMMARY OF THE INVENTION

A primary objective of the invention is to provide methods, systems, apparatus and devices for a high efficiency and high power density wide range input isolated dc-dc converter.

A secondary objective of the invention is to provide methods, systems, apparatus and devices to provide a parallel post regulator having a smaller conduction loss than conventional post regulators for use in wide range input isolated DC/DC converter resulting in high efficiency.

A third objective of the invention is to provide methods, systems, apparatus and devices for a wide input range front end DC/DC converter for use in distributed power systems and server power supplies which require a hold up time to provide output voltage within regulation after input AC line dropout at full load conditions.

A fourth objective of the invention is to provide methods, systems, apparatus and devices to provide a DC/DC converter that reduces voltage stresses across main rectifiers, has a smaller conduction losses compared with conventional post regulators and the requirement of input and output filters is significantly reduced due to the filtered waveforms produced.

A fifth objective of the invention is to provide methods, systems, apparatus and devices to provide a DC/DC converter that has small current stresses components of parallel post regulator resulting in high efficiency and high power density.

A first preferred embodiment of the invention provides a wide high efficiency range input DC/DC converter. The DC/DC converter includes a voltage source for providing a direct input voltage and an input rectifier circuit for converting the direct input voltage to a primary rectified voltage, wherein the primary side switches operate with a duty cycle to achieve zero voltage switching. The secondary side includes a main rectifier circuit connected across the secondary winding of a transformer provide a load current to a load and includes a parallel post regulator connected in parallel with the main rectifier for providing a supplemental load current when the main rectifier is in an off state to regulate the output power. The DC/DC converter provides a high efficiency and high power density wide input range front end DC/DC converter for use in distributed power systems and server power supplies.

A second embodiment provides a method for DC/DC conversion comprising the steps of converting a direct input voltage to a primary rectified voltage, switching a secondary main rectifier to an on state to provide an output current to a load, switching the secondary main regulator to an off state and switching a parallel post regulator to an on state when the secondary main regulator is switched to an off state during to provide a supplemental load current to the load to provide a high efficiency and high power density wide range input isolated DC/DC converter.

Further objects and advantages of this invention will be apparent from the following detailed description of preferred embodiments which are illustrated schematically in the accompanying drawings.

DESCRIPTION OF THE PREFERRED EMBODIMENTS

Figure 1:
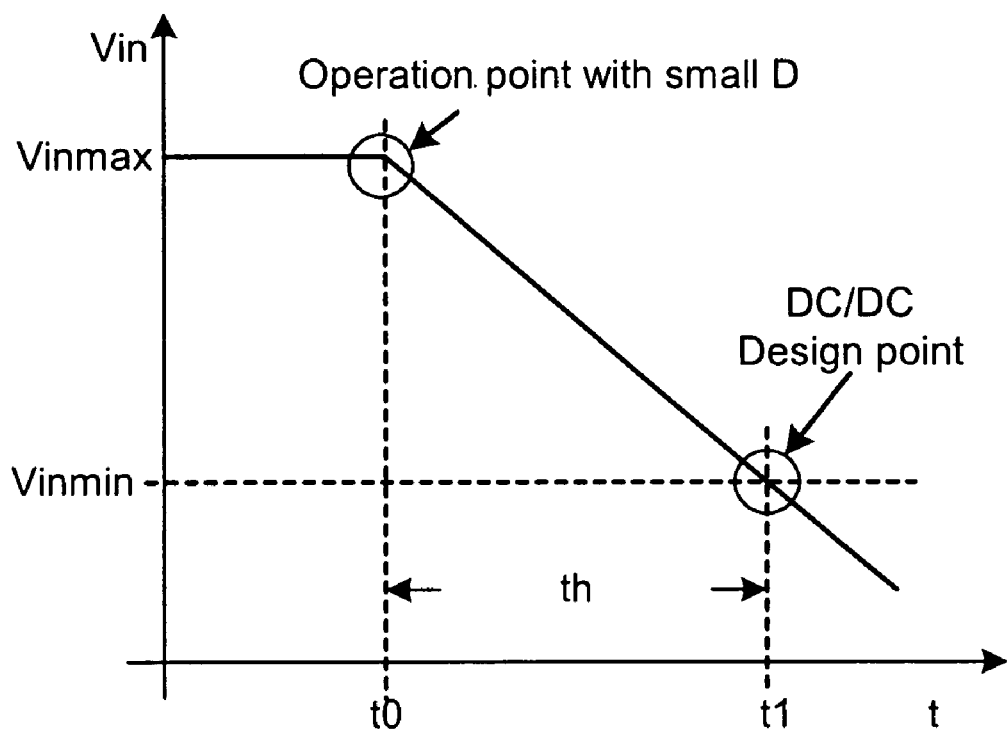
FIG. 1 is a schematic diagram showing the front end DC/DC converter.
Figure 2:
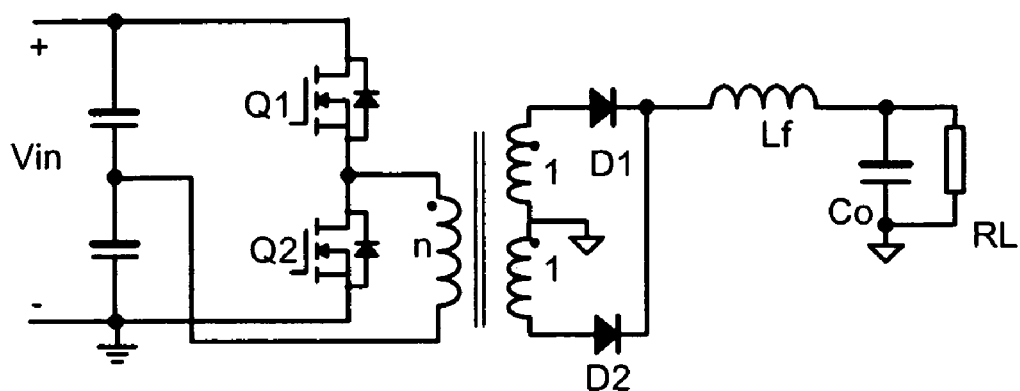
FIG. 2 is a schematic diagram of a prior art half bridge converter.
Figure 3A:
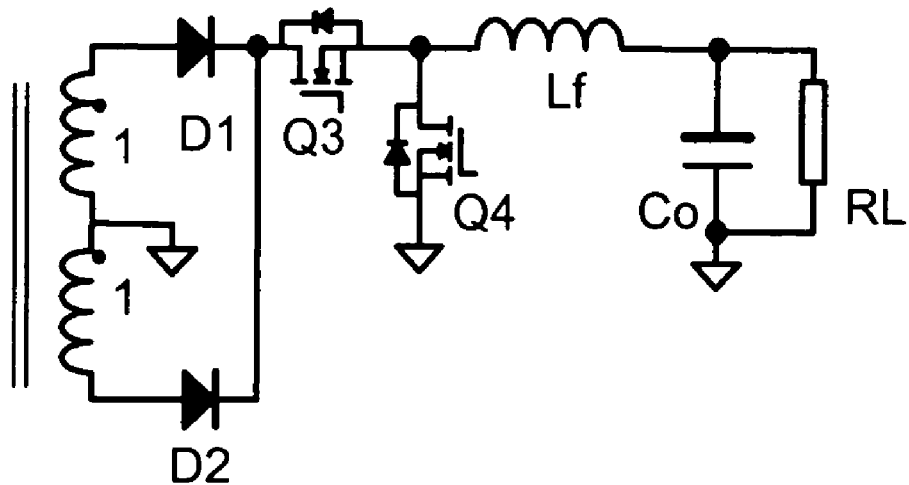
FIG. 3a is a schematic diagram of an example of a prior art secondary side post regulators.
Figure 3B:
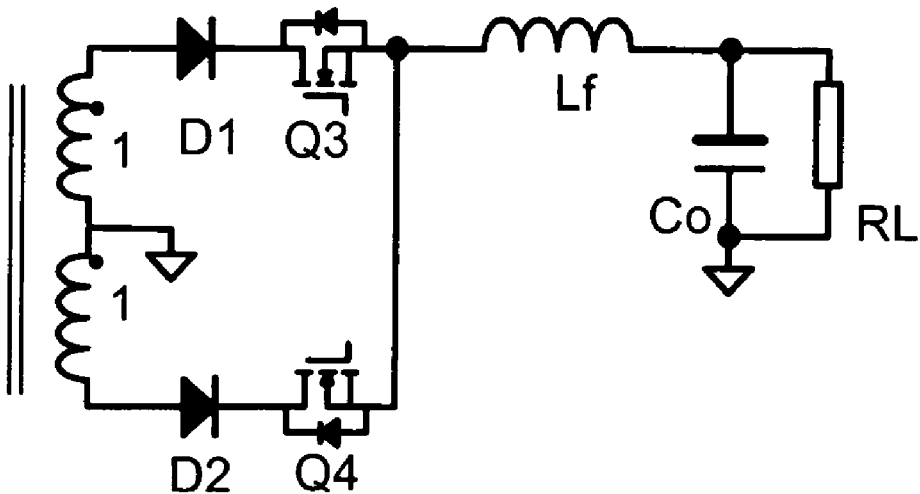
FIG. 3b is a schematic diagram of a second example of a prior art secondary side post regulators.
Figure 3C:
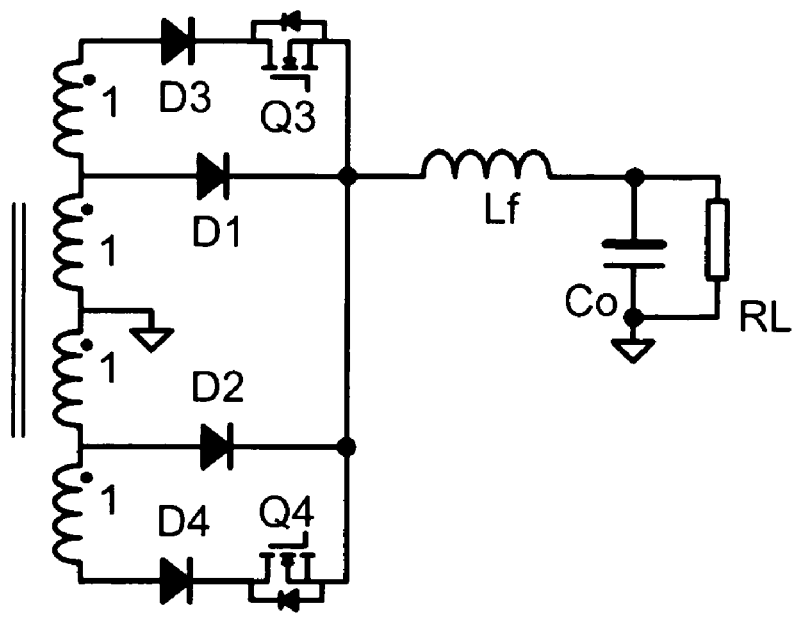
FIG. 3c is a schematic diagram of a third example of a prior art secondary side post regulators.
Figure 3D:
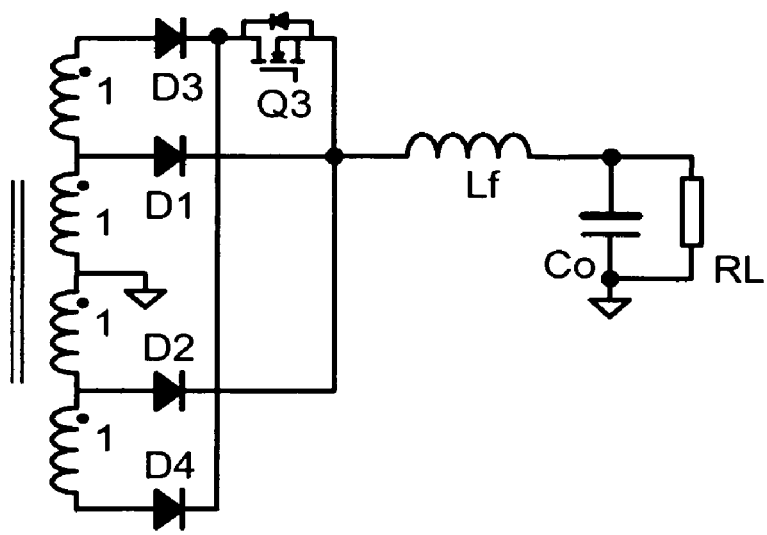
FIG. 3d is a schematic diagram of range winding topology.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | | | |
|---|---|---|---|
| 10 | primary side half bridge | 30 | parallel post regulator |
| 20 | main rectifier | 32 | secondary winding |
| 34 | secondary winding | 502 | three secondary winding voltage 3Vs |
| 100 | drive signal waveforms | | |
| 101 | Q1 drive signal | 600 | voltage across Q3 |
| 102 | Q2 drive signal | 601 | secondary voltage Vs |
| 103 | dead time td | 602 | max voltage across Q3 |
| 200 | Q3 drive signal waveform | 700 | $V_{LF1}$ waveform |
| 201 | Q3 drive signal pulse | 701 | rectified voltage $V_{LF1}$ approximately 2Vs |
| 300 | primary voltage waveform | | |
| 301 | half of input voltage Vin | 800 | rectified voltage $V_{LF}$ waveform |
| 400 | primary current waveform | | |
| 401 | primary input current | 801 | max rectified voltage $V_{LF}$ approximately 2Vs |
| 402 | Ip with parallel post regulator conduction | 802 | min rectified voltage $V_{LF}$ approximately Vs |
| 500 | voltage across D1 | | |
| 501 | one secondary winding voltage Vs | 900 | filter inductor Lf current |
| | | 901 | output current I |

The apparatus, methods, systems and devices of the present invention provide a topology which delivers most of the needed power to a load with approximately 0.5 duty cycle in primary side with part of power delivered by a novel parallel post regulator to regulate the output voltage using secondary side control. The novel parallel post regulator has a smaller conduction loss than conventional post regulators to achieve high efficiency. The apparatus, methods, systems and device of the present invention provide a high efficiency and high power density wide range input isolated dc-dc converter. Wide input range front end DC/DC converters are widely used in the distributed power systems (DPS) and server power supplies which require a hold up time to provide output voltage within regulation after input AC line dropout at full load conditions.

Figure 4:
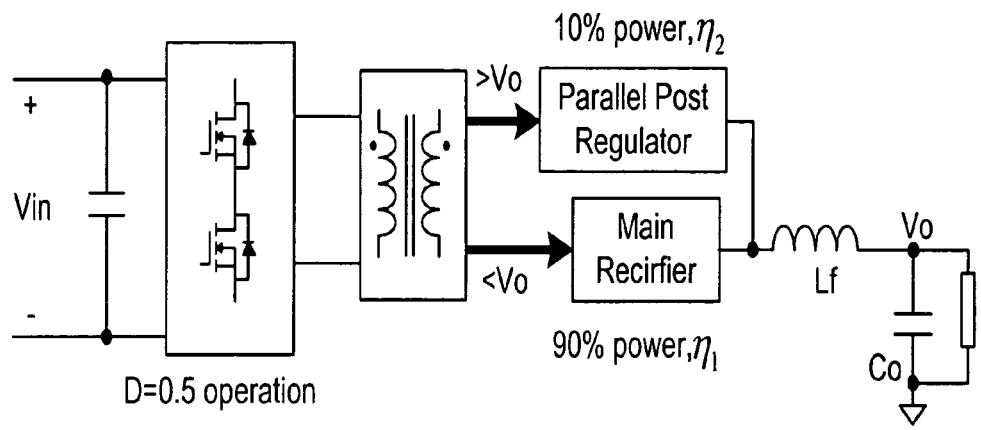
FIG. 4 is a block diagram of the DC/DC converter using the parallel post regulator according to the present invention.

FIG. 4 is a block diagram showing the concept of a parallel post regulator used with a DC/DC converter. The primary side structure can be a half bridge, full bridge, push-pull and flyback and forward topologies. Primary side switches operate with a duty cycle D=0.5 so the switches can easily achieve zero voltage switching in full range load. A large amount of the power, approximately 90%, is delivered to the load by unregulated output voltage that is less than output voltage Vo with very high efficiency $\eta_1$. The parallel post regulator only delivers small amount of the power such as 10% with efficiency $\eta_2$ and regulates the output voltage, whose input voltage is higher than the converter output voltage to achieve high total efficiency.

Figure 5:
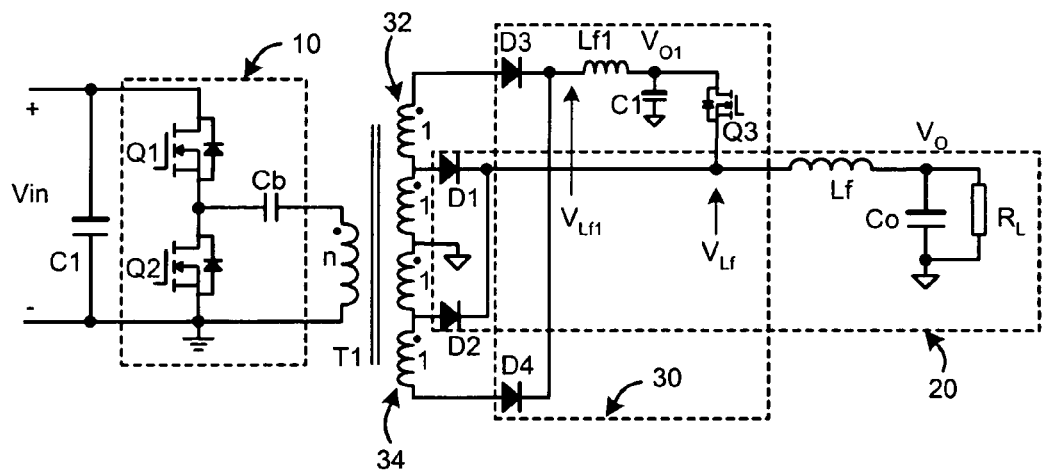
FIG. 5 is a schematic diagram of an implementation of a DC/DC converter using the parallel post regulator according to the present invention.

FIG. 5 is a schematic diagram showing an example of an implementation circuit using a parallel post regulator 30 in a circuit having a half bridge 10 in the primary side topology. The parallel post regulator 30 includes two secondary transformer windings 32 and 34, rectifiers D3 and D4, filter including inductor Lf1 and capacity C1, and switch Q3. The rest of the circuit is the conventional half bridge converter 10 with 0.5 duty cycle operation in primary side. Cb is the blocking capacitor for the half bridge 10, which alternatively could be two separated capacitors. Because of the 0.5 duty cycle operation in the primary side, switches Q1 and Q2 easily achieve zero voltage switching (ZVS) at full range load and wide range input with smaller voltage stresses across main rectifiers D1 and D2.

The rectified voltage Vo1 in the parallel post regulator 30 doubles the output voltage of main rectifier 20 because of the two secondary windings 32 and 34 in the parallel post regulator 30. The current through rectifiers D3 and D4 is the average current of parallel post regulator 30, which is the product of the duty cycle of parallel post regulator 30 and the output current. At the same time, parallel post regulator 30 utilizes main rectifiers D1 and D2 of half bridge converter 20 as its freewheeling diodes. The switching frequency of the parallel post regulator 30 is independent of the switching frequency of the primary half bridge converter 10. The key waveforms corresponding to the parallel post regulator 30 are shown in FIG. 6.

Figure 6:
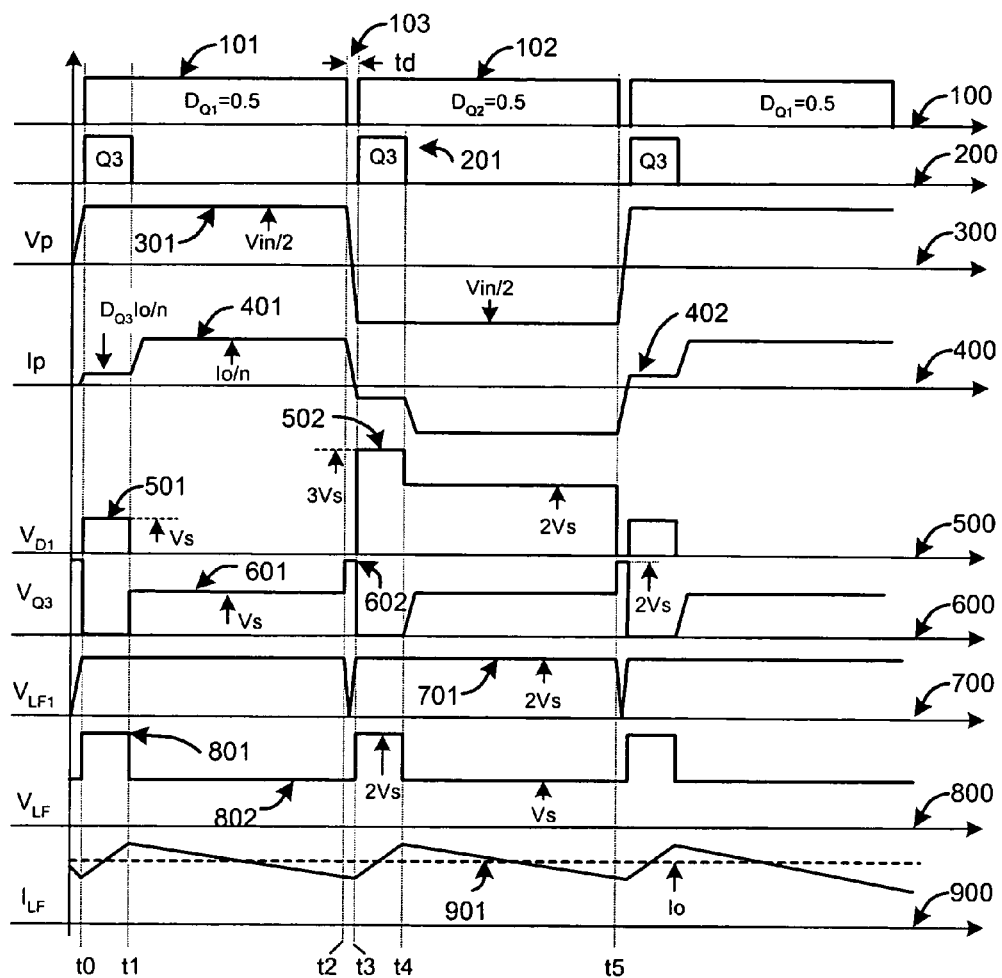
FIG. 6 is a graph of waveforms corresponding to operation of the parallel post regulator shown in FIG. 5.
Figure 7A:
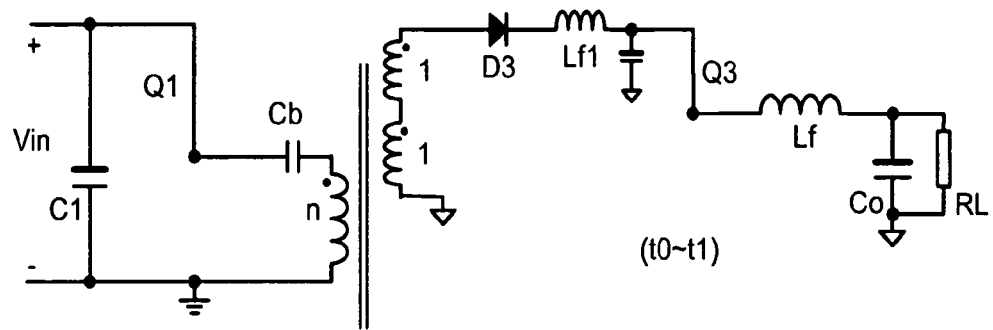
FIG. 7a is a schematic diagram of an operation of the parallel post regulator between time t0 and approximately t1 as shown in FIG. 6.

As shown by the waveforms in FIG. 6, there are three main operation modes of the parallel post regulator 30 in half switching periods for the circuit shown in FIG. 5. As shown in FIG. 7a, during time t0 to approximately t1, switches Q1 and Q3 turn on and main rectifiers D1 and D2 are in off the state. During this time, the primary voltage shown by waveform 300 is approximately one half of the input voltage Vin as shown by waveform 301. The voltage across rectifier D1 shown in waveform 500 is approximately the one transformer secondary winding voltage 501. Parallel post regulator 30 provides the output load current during this time period. The duty cycle of switch Q3 is shown as 201 in waveform 200. The current through rectifiers D3 and D4 is the product of the output current 901 and the duty cycle 201 of switch Q3.

Referring to the transformer primary current waveform 400 in FIG. 6, the transformer primary current 402 during parallel post regulator conduction is less than the primary current Ip 401 in main rectifier conduction. There is a small conduction loss in primary switches Q1 and Q2 and secondary side rectifier D3 and D4 because of its small current and as shown in waveform 800, the voltage for filter Lf 801 is approximately twice the one transformer secondary winding voltage Vs.

Figure 7B:
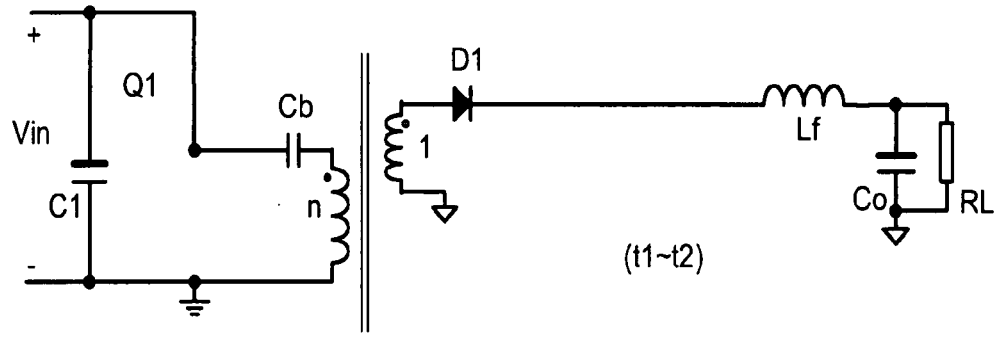
FIG. 7b is a schematic diagram of another operation of the parallel post regulator between time t1 and approximately t2 as shown in FIG. 6.

At time interval t1, parallel post regulator 30 turns off and the secondary inductor current transfers from switch Q3 to rectifier D1, after that, rectifier D1 conducts all the load current during time between t1 and approximately t2 as shown in FIG. 7b. During this time period the rectified voltage $V_{LF}$ 802 for filter Lf is approximately equal to one transformer secondary winding voltage Vs.

Figure 7C:
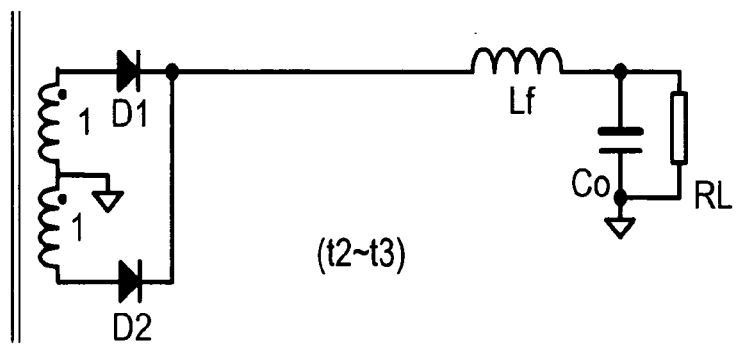
FIG. 7c is a schematic diagram of operation of the parallel post between time t2 and approximately t3 as shown in FIG. 6.

At the time t2, switch Q1 turns off as shown by waveform 101 and the energy stored in the transformer primary leakage inductor starts to charge the parasitic capacitors of switches Q1 and Q2 until the body diode $D_{Q2}$ of Q2 begins conducting as shown by waveform 102, thus switch Q2 achieves zero-voltage-switching during the dead time $t_d$ 103 shown in drive signal waveform 100. At the same time, both diodes D1 and D2 in the secondary side main rectifier 20 conduct together to free-wheel inductor current during which time the voltage 601 across switch Q3 is approximately the one secondary windings voltage Vs as shown in FIG. 7c. This mode ends when switch Q3 turns on again at time t3. Switch Q3 has the maximum voltage stress as shown by 602 in the voltage across Q3 waveform 600 between time t2 and approximately t3 and voltage $V_{LF1}$ 701 across the parallel post regulator inductance filter Lf1 increase as shown in waveform 700. The current through the main regulator filter inductor Lf is shown in waveform 900. The maximum voltage across rectifier D1 shown in waveform 500 is approximately three secondary winding voltage 502 between time t3 and approximately t4.

From the volt-second balance in filter inductor Lf, the DC voltage conversion ratio in continuous conduction mode is obtained from $$Vo=(Vin/2n)(1+D)$$

According to the above equation, the parallel post regulator can be designed for the highest DC input voltage with small duty cycle D to regulate the tight voltage so that the unregulated output voltage can be very close to output voltage by large turn ratio transformer and the rest of the voltage is compensated by the parallel post regulator. Large turn ratio transformer reduces the current rating in the primary side resulting in reduced conduction loss and reduces the voltage stresses on the main rectifier resulting in low conduction loss in secondary side. When input DC voltage drops, the duty cycle D of parallel post regulator increases to regulate output voltage.

Figure 8:
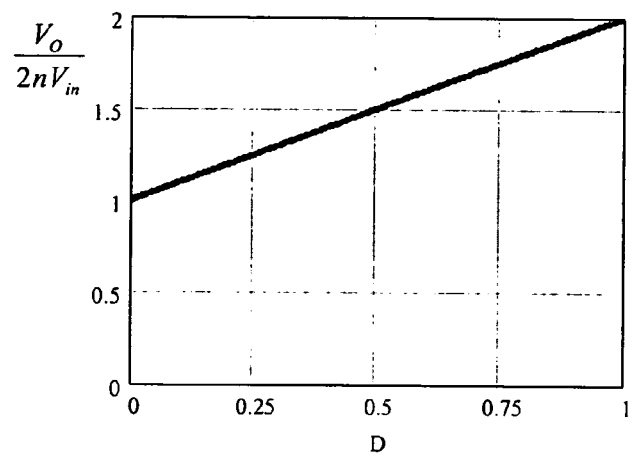
FIG. 8 is a graph of the normalized DC conversion ratio verses duty cycle.

FIG. 8 shows the curve of normalized DC conversion ratio vs duty cycle. As shown, the parallel post regulator operates in 2 times wide range input voltage applications for regulated output voltage in ideal case. Furthermore, the input and output filter requirements are significantly reduced due to approximately perfect filtered waveforms Ip and $V_{Lf}$, shown in FIG. 6, for power density improvement.

Figure 9:
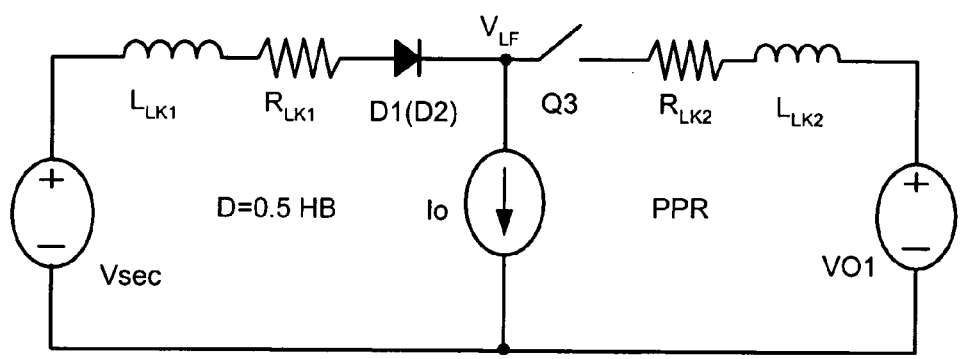
FIG. 9 is an equivalent circuit for current communication between half-bridge and post parallel regulator.

FIG. 9 shows the current commutation between the half bridge main rectifiers D1 and D2 with switch Q3 in the parallel post regulator. Vsec is the one transformer secondary winding voltage, inductance $L_{LK1}$ is the total secondary leakage inductances of the half bridge converter including the inductance of printed circuit board traces and components, and resistance $R_{LK1}$ is their total resistance. Inductance $L_{LK2}$ and resistance $R_{LK2}$ are the total parasitic inductances and resistances, respectively, in the parallel post regulator. Io is the constant output current, voltage Vo1 is the parallel post regulator input voltage. Current I1 in the half bridge decreases and current I2 in parallel post regulator increases. The slew rate of the two currents is determined by the voltage difference between Vo1 and Vsec and the corresponding inductance and resistance. During the dead time td the second voltage Vsec is approximately equal to zero, the time of current commutations between the half bridge main rectifier and the parallel post regulator is the shortest, resulting in a reduced turn-on switching loss in parallel post regulator. Therefore, trailing edge modulation is adopted in secondary side control to control the pulse width in the post regulator controller.

Figure 10A:
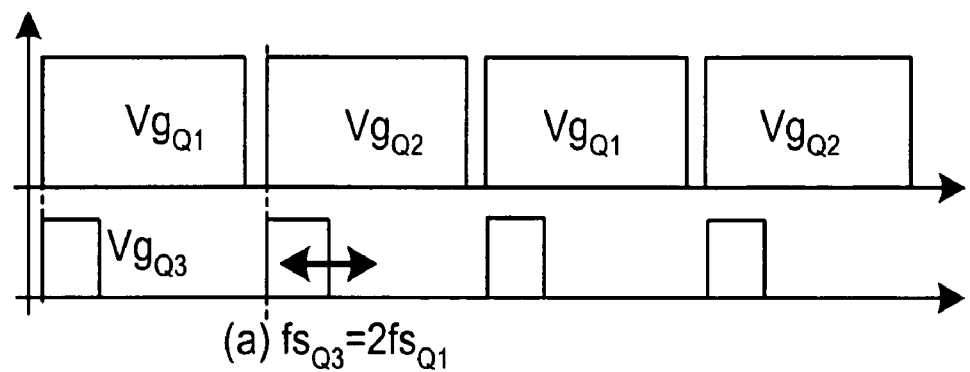
FIG. 10a shows a control method for the parallel post regulator with a first switching frequency.
Figure 10B:
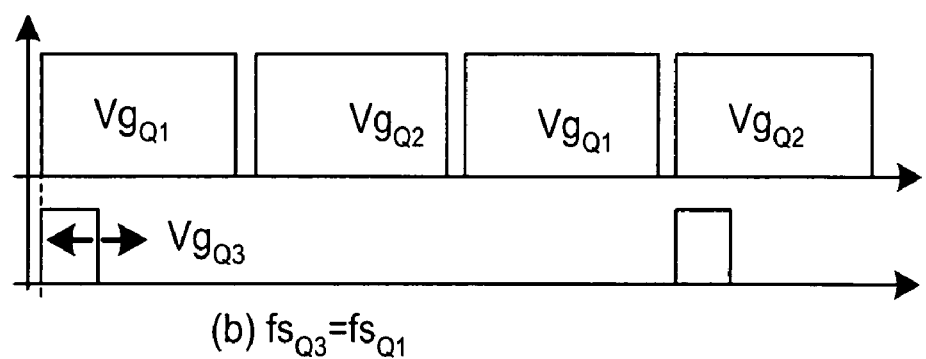
FIG. 10b shows another control method for the parallel post regulator with a second switching frequency.

FIGS. 10a and 10b show two different control methods with different switching frequency and trailing edge modulation in the parallel post regulator. The waveforms in FIG. 10a show the voltage $Vg_{Q1}$ and $Vg_{Q1}$ using a control method wherein the switching frequency $fs_{Q1}$ of switch Q1 is approximately twice the switching frequency $fs_{Q1}$ of switch Q3. FIG. 10b shows the waveforms for the second control method with the switching frequency $fs_{Q1}$ of switch Q1 approximately equal to the switching frequency $fs_{Q1}$ of switch Q3. The switching frequency of Q3 can be independent on the switching frequency of Q1. Either secondary control method is used for effectively controlling the pulse width in the post regulator controller.

The parallel post regulator utilizes the main rectifiers D1 and D2 as its freewheeling diodes so that it simplifies the circuit and improves efficiency. Also, in the main rectifiers a smaller current through rectifiers D3 and D4 cause smaller conduction loss in primary and secondary side, so that the parallel post regulator efficiency $\eta_2$ is higher than prior art post regulators. $\eta_1$ is the efficiency of unregulated output voltage in the half bridge converter operating in 0.5 duty cycle with main rectifiers. The total efficiency of half bridge and the parallel post regulator is obtained according to $\eta=(\eta_1\eta_2)/((1-D)\eta_2+D\eta_1)$.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A parallel post regulator for a power converter having an input rectifier connected to a transformer primary winding and a main regulator connected to a center portion of a transformer secondary winding, the parallel post regulator comprising:
   a switching circuit connected across the secondary transformer winding for activating the parallel post regulator connected to an output of the main regulator to provide a supplemental output load current when said main regulator is in an off state;
   a filter connected between said switching circuit and an output for filtering the supplemental output current, wherein one end of the parallel post regulator is connected across the transformer secondary winding and a second end is connected to an output of the main regulator to provide the supplemental output current to regulate one single output voltage of the converter for high efficiency and high power density.

2. A high efficiency wide range input DC/DC converter comprising:
   a voltage source for providing a direct input voltage;
   an input rectifier circuit connected with the voltage source for converting the direct input voltage to a primary rectified voltage;
   a transformer having a primary winding and a secondary winding, wherein the input rectifier circuit is connected across the primary winding, the secondary having at least four serial secondary windings;
   a main rectifier circuit connected across a second and a third secondary winding of said transformer secondary to provide an output voltage to one single load; and
   a parallel post regulator connected across the secondary winding and having an output connected to the main rectifier output for providing a supplemental output current when the main rectifier is in an off state to regulate the output power, wherein the DC/DC converter provides a high efficiency and high power density wide input range front end DC/DC converter.

3. The DC/DC converter of claim 2, wherein said input rectifier circuit comprises:
   at least two primary side switches that operate with a duty cycle to achieve zero voltage switching.

4. The DC/DC converter of claim 2, wherein said input rectifier circuit comprises:
   a half-bridge topology having an approximately 0.5 duty cycle to achieve zero-voltage-switching.

5. The DC/DC converter of claim 2, wherein said input rectifier circuit comprises:
   a full-bridge topology having an approximately 0.5 duty cycle to achieve zero-voltage-switching.

6. The DC/DC converter of claim 2, wherein said input rectifier circuit comprises:
   one of a push-pull and flyback and a forward topology.

7. The DC/DC converter of claim 2, wherein said parallel post regulator comprises:
   a switching circuit connected with an output of the power converter for activating the parallel post regulator to provide a supplemental output power when the main regulator is in an off state;
   a filter between the switching circuit and the output for filtering a supplemental output voltage.

8. The system of claim 2, further comprising:
   a distributed power systems, wherein said system is used in said distributed power system which requires a hold up time to provide the output voltage within regulation after input AC line dropout at full load conditions.

9. The system of claim 2, further comprising:
   a server power supply, wherein said system is used in said server power supply which require a hold up time to provide output voltage within regulation after input AC line dropout at full load conditions.

10. A method for DC/DC conversion to produce one signal regulated output voltage comprising the steps of:
    converting an direct input voltage to a primary rectified voltage;
    providing a main regulator for receiving a secondary regulated voltage to provide an output voltage to a load; and
    using a parallel post regulator for secondary side control to generate a supplement output current to regulate the output voltage when the main regulator is in an off state to produce one single regulated output voltage a high efficiency and high power density wide range input DC/DC converter.

11. A method for DC/DC conversion comprising the step of:
    converting an direct input voltage to a primary rectified voltage during a first and a second time period;
    switching a secondary main rectifier to an on state during the second time period to provide an output current to a load;
    switching the secondary main regulator to an off state at the end of the second time period;
    switching a parallel post regulator to an on state during the first time period when the secondary main regulator is switched to an off state to provide a supplemental load current to the load;
    generating one single output voltage that is regulated by the supplemental load current; and
    repeating the switching steps to provide a high efficiency and high power density wide range input isolated DC/DC converter.

* * * * *